C. C. EPPS.
FEEDER FOR COTTON PRESSES.
APPLICATION FILED JUNE 1, 1910.
987,869.
Patented Mar. 28, 1911.
2 SHEETS—SHEET 1.
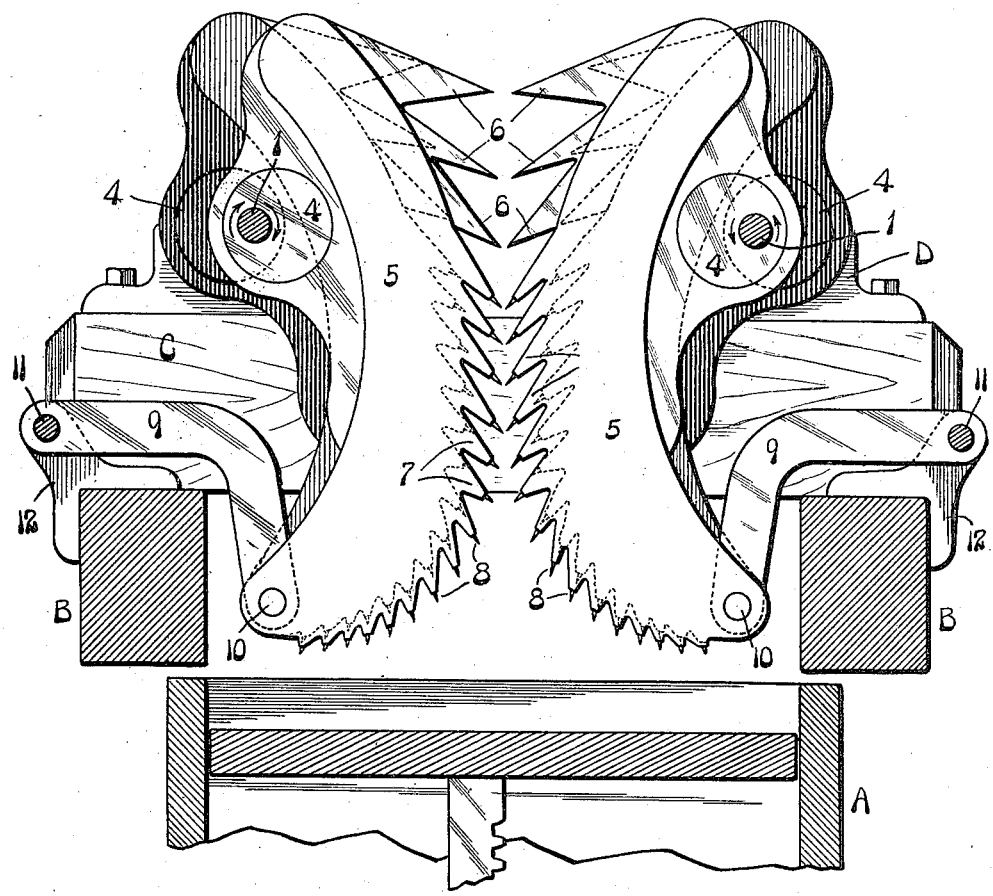
Fig. I.
Attest
A. J. McCauley
E. B. Linn
Inventor:
Clinton C. Epps
by E. S. Knight
Atty.

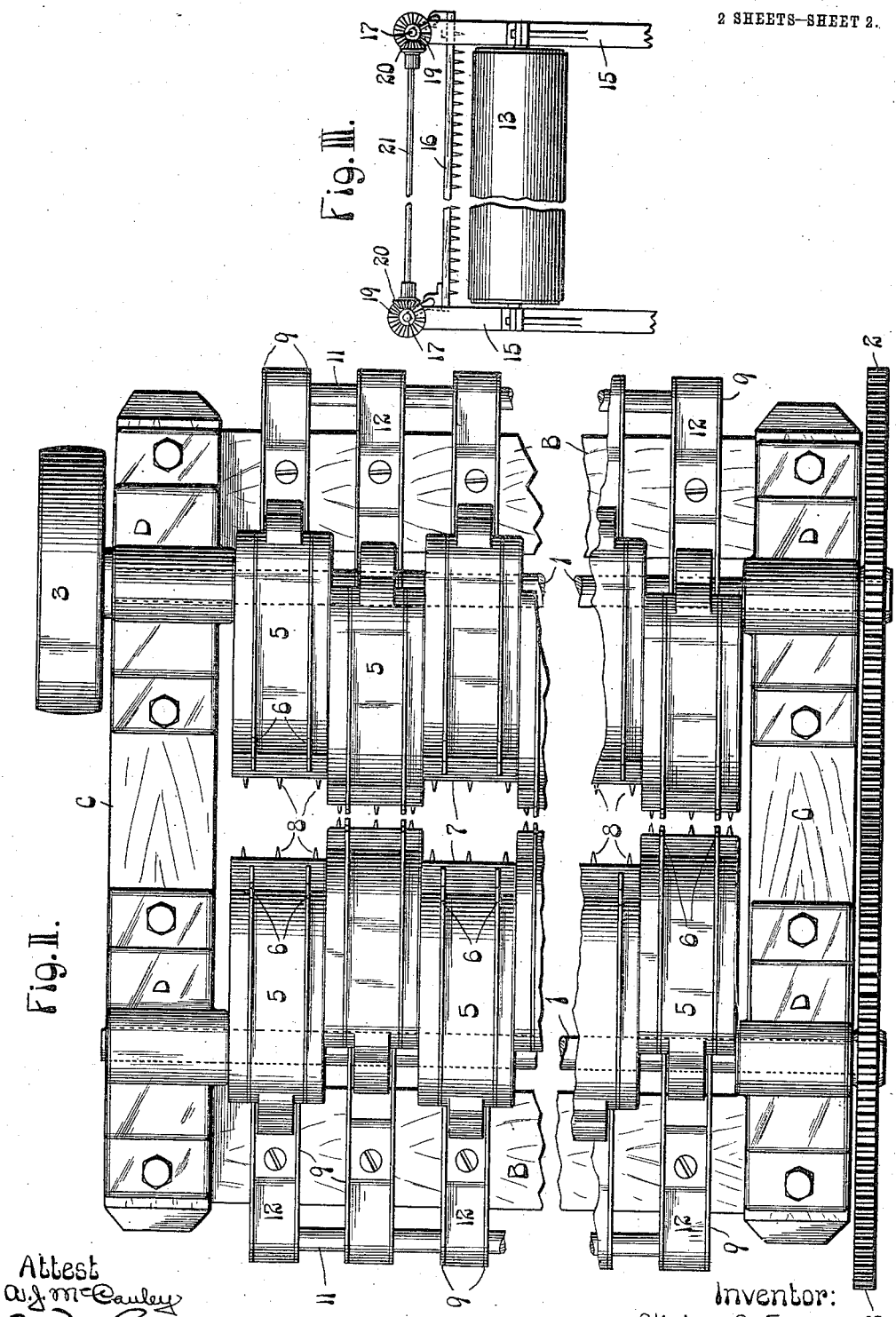

UNITED STATES PATENT OFFICE.

CLINTON C. EPPS, OF HASTINGS, OKLAHOMA.

FEEDER FOR COTTON-PRESSES.

987,869.　　　　　　Specification of Letters Patent.　　Patented Mar. 28, 1911.

Application filed June 1, 1910. Serial No. 564,378.

*To all whom it may concern:*

Be it known that I, CLINTON C. EPPS, a citizen of the United States of America, residing at Hastings, in the county of Jefferson and State of Oklahoma, have invented certain new and useful Improvements in Feeders for Cotton-Presses, of which the following is a full, clear, and exact description, reference being had to the accompanying drawings, forming part of this specification.

My invention relates to a feeder for both delivering a bat of cotton into a cotton press baling chamber as it comes from the condenser and packing it in said baling chamber.

My invention further relates to means coöperable with the feeder for adjusting a bat of cotton on the conveyer that carries it to the feeder.

Figure I is a cross section of my feeder and the bat delivery means, the latter being shown in side elevation. Fig. II is a top or plan view of the feeder, a portion being broken out. Fig. III is an end elevation of a conveyer that leads from the condenser to the feeder, and the means coöperable with the feeder by which the bat of cotton is adjusted on the conveyer.

In the accompanying drawings: A (see Fig. I) designates a portion of a cotton press baling chamber above which my feeder is located. The feeder is supported by framework comprising longitudinal sills or beams B and head blocks C mounted on the sills and provided with journal boxes D.

1 designates shafts journaled in the journal boxes being arranged parallel with each other, the shafts being connected by gear wheels 2, and one of them being supplied with a drive wheel 3 to which power may be transmitted in any suitable manner for the operation of the shafts so that they will rotate in unison. Each shaft 1 is provided with a plurality of eccentrics 4 arranged in sets on each shaft in which the eccentrics of one set are offset from the eccentrics of another set with the object in view of providing for the eccentrics of the separate sets performing their offices differently from the eccentrics of another set.

5 designates feeder heads loosely fitted to the eccentrics 4. These feeder heads are of crescent shape, and being fitted to the eccentrics, they are adapted to partake of an oscillatory rise and fall motion during the rotation of the shafts 1 to approach each other as they descend, and to move apart as they ascend. Each feeder head carries at its upper end sharp teeth 6 that extend toward the corresponding teeth of the other head, and the points of which are directed downwardly at the inner or working faces of the heads. There are preferably two or more sets of these sharp teeth upon each feeder head. The feeder heads are provided at their inner or working faces, beneath the location of the sharp teeth 6, with downwardly extending blunt teeth 7 which are preferably of gradually decreasing lengths from the uppermost of such teeth to the lowermost, and which extend the full width of the working faces of the feeder heads. At the ends of the teeth 7 are prongs 8.

9 designates controlling links pivotally connected at 10 to the lower ends of the feeder heads and pivoted at 11 to brackets 12 supported by the framework on which the feeding members are mounted.

In the practical use of my cotton press feeder, it is operated in the following manner: As the shafts 1 rotate in unison in the directions indicated by the arrows, Fig. I, the eccentrics 4 act to elevate the feeder heads in pairs in a manner that causes them to move away from each other while oscillatory movement of their lower ends is occasioned by the controlling links 9; and as the eccentrics continue to rotate after they have elevated the heads, they cause the heads to approach each other and descend in pairs. It will therefore be readily understood that a bat of cotton, such as is commonly produced in a cotton condenser, upon being delivered in a vertical direction to the feeder from a point above it, will be grasped by the sharp teeth 6 at the upper ends of the feeder heads, and this bat will be carried between the heads as they move downwardly and approach each other so that, upon each downward movement of the feeder heads, the bat will be fed to the baling chamber A. As the bat continues its downward movement, due to the action thereupon by the teeth 6, it is gripped between the blunt teeth 7 of the feeder heads and their prongs 8 located immediately beneath the teeth 6, and which also act to feed the bat downwardly until it is engaged by the teeth 7 and their prongs that are arranged at the curved lower ends of the feeder heads. The bat is caught by the last named teeth and prongs and carried outwardly from the feed-way between the feeder heads in order that it may be evenly distributed in the baling chamber into which it falls as the feeder heads ascend after their downward movement and be packed in the baling chamber above the movable supporting block therein. The teeth 7 are made blunt in order that the bat will escape therefrom more readily than it would if they were sharp and the teeth became embedded into the bat, and the prongs 8 being short in length, they serve as means for enabling such teeth to obtain a better grip upon the bat of cotton without liability of the bat adhering thereto to such degree as to prevent its ready disengagement from the prongs at the proper time for it to be dislodged from the feeder heads.

As previously mentioned, the sets of eccentrics 4 are arranged so that the eccentrics of one set are offset from the eccentrics of another set, and it will be readily understood that by this arrangement provision is made for a desired number of pairs of the feeder heads partaking of downward and feeding movement while other pairs of the feeder heads are partaking of an upward movement previous to a downward feeding movement, and that consequently the feeding action is rendered continuous.

The bat of cotton to be delivered into the baling chamber by my feeder is carried to the feeder by a conveyer belt 13 leading from the condenser (not shown) and which travels upon a roller 14 supported by standards 15. To provide for the adjustment of a bat of cotton on this conveyer belt in order that it will be properly delivered to the feeder, I provide a rake 16 located above the belt and supported by crank shafts 17 supported by the standards 15, and which act to move the rake transversely of the conveyer belt with an oscillatory motion so that it is carried toward the side of said belt at which it is to be discharged to the feeder. One of the crank shafts is supplied with a drive pulley 18, and the crank shafts are provided with bevel gear wheels 19 having in mesh therewith bevel pinions 20 carried by a shaft 21 in order that the second crank shaft may partake of the same movement as that partaken of by the crank shaft supplied with the drive pulley 18. The drive pulley 18 is operated through the medium of any suitable power connection in conjunction with the shafts 1 of my feeder in order that the rake 16 may be coöperable with the feeder.

I claim:—

1. In a cotton press feeder, a pair of shafts, and feeder heads mounted on said shafts, the shafts being provided with means to which the feeder heads are loosely fitted and whereby the feeder heads are moved upwardly and outwardly relatively to each other and then downwardly and inwardly relatively to each other during the rotation of the shafts.

2. In a cotton press feeder, a pair of shafts, feeder heads mounted on said shafts, the shafts being provided with means whereby the feeder heads are moved upwardly and outwardly relatively to each other and then downwardly and inwardly relatively to each other during the rotation of the shafts, and means for controlling the movement of the lower ends of the feeder heads.

3. In a cotton press feeder, a pair of shafts, feeder heads mounted on said shafts, the shafts being provided with means whereby the feeder heads are moved upwardly and outwardly relatively to each other and then downwardly and inwardly relatively to each other during the rotation of the shafts, and means having pivotal connection with the lower ends of the feeder heads for controlling their movements.

4. In a cotton press feeder, a pair of shafts, feeder heads mounted on said shafts, the shafts being provided with means whereby the feeder heads are moved upwardly and outwardly relatively to each other and then downwardly and inwardly relatively to each other during the rotation of the shafts, and links pivotally connected to the lower ends of said heads and having pivotal connection with fixed members adjacent thereto for controlling the movements of the heads.

5. In a cotton press feeder, a pair of shafts provided with eccentrics or their equivalent, and feeder heads loosely mounted on said eccentrics to be moved upwardly and outwardly relatively to each other and then downwardly and inwardly relatively to each other during the rotation of the shafts.

6. In a cotton press feeder, a pair of shafts provided with eccentrics or their equivalent, feeder heads loosely mounted on said eccentrics to be moved upwardly and outwardly relatively to each other and then downwardly and inwardly relatively to each other during the rotation of the shafts, and means for controlling the movements of the lower ends of said feeder heads.

7. In a cotton press feeder, a pair of shafts provided with eccentrics or their equivalent, feeder heads loosely mounted on said eccentrics to be moved upwardly and outwardly relatively to each other and then downwardly and inwardly relatively to each other during the rotation of the shafts, and links pivoted to the lower ends of said feeder heads for controlling their movements.

8. In a cotton press feeder, a pair of shafts and feeder heads loosely mounted on said shafts, the shafts being provided with means whereby the feeder heads are moved upwardly and outwardly relatively to each other and then downwardly and inwardly relatively to each other, and the feeder heads being so arranged as to provide for upward and outward movements of some of the heads, while the other heads are moving downwardly and inwardly relative to each other.

9. In a cotton press feeder, a pair of shafts provided with eccentrics and feeder heads loosely mounted on said eccentrics, some of the eccentrics of each shaft being offset from the other eccentrics on the same shaft to provide for differential movement of the feeder heads.

10. In a cotton press feeder, a pair of shafts, and feeder heads mounted on said shafts, the shafts being provided with means to which the feeder heads are loosely fitted and whereby the feeder heads are moved upwardly and outwardly relatively to each other and then downwardly and inwardly relatively to each other during the rotation of the shafts, each of said feeder heads being provided with teeth at its face opposing the other feeder head.

11. In a cotton press feeder, a pair of oscillatorily supported feeder heads, each provided at its upper end with sharp teeth and beneath said sharp teeth with blunt teeth provided with prongs.

12. The combination with a cotton press feeder, of a conveyer for delivering a bat of cotton to the feeder, a rake above said conveyer, and means coöperable with said feeder whereby said rake is moved transversely of said conveyer to adjust the bat of cotton thereon.

CLINTON C. EPPS.

In the presence of—
A. J. McCauley,
E. B. Linn.

---

Copies of this patent may be obtained for five cents each, by addressing the "Commissioner of Patents, Washington, D. C."